United States Patent
Sahay et al.

(10) Patent No.: US 11,757,891 B1
(45) Date of Patent: Sep. 12, 2023

(54) USING A HOST APPLICATION TO AUTHORIZE A USER OF A CLIENT DEVICE TO PERFORM AN ACTION WITHIN A GUEST APPLICATION

(71) Applicant: Meta Platforms, Inc., Menlo Park, CA (US)

(72) Inventors: Yash Sahay, London (GB); Ahmed Shehata, London (GB)

(73) Assignee: Meta Platforms, Inc., Menlo Park, CA (US)

( * ) Notice: Subject to any disclaimer, the term of this patent is extended or adjusted under 35 U.S.C. 154(b) by 233 days.

(21) Appl. No.: 16/667,612

(22) Filed: Oct. 29, 2019

(51) Int. Cl.
*H04L 9/40* (2022.01)

(52) U.S. Cl.
CPC .......... *H04L 63/102* (2013.01); *H04L 63/08* (2013.01)

(58) Field of Classification Search
CPC ........ H04L 63/102; H04L 63/08; H04L 63/10
See application file for complete search history.

(56) References Cited

U.S. PATENT DOCUMENTS

| | | | | |
|---|---|---|---|---|
| 5,689,638 A * | 11/1997 | Sadovsky | ............... | G06F 21/31 707/999.009 |
| 5,764,890 A * | 6/1998 | Glasser | ................... | H04L 63/08 726/11 |
| 5,815,665 A * | 9/1998 | Teper | ..................... | G06Q 20/00 705/26.35 |
| 6,377,994 B1 * | 4/2002 | Ault | ........................ | H04L 63/10 707/999.009 |
| 7,016,877 B1 * | 3/2006 | Steele | .................... | G06Q 30/02 705/50 |
| 10,154,021 B1 * | 12/2018 | Lerner | ...................... | H04L 9/32 |
| 10,455,186 B2 * | 10/2019 | Mok | .................. | H04N 21/4223 |
| 2003/0037044 A1 * | 2/2003 | Boreham | ................ | G06F 16/10 |
| 2003/0212887 A1 * | 11/2003 | Walther | .................. | H04L 63/08 713/168 |
| 2007/0004393 A1 * | 1/2007 | Forsberg | ................. | H04W 4/50 455/420 |
| 2007/0143824 A1 * | 6/2007 | Shahbazi | .............. | H04L 63/102 726/1 |
| 2008/0160958 A1 * | 7/2008 | Abichandani | ......... | H04W 8/183 455/410 |
| 2008/0162688 A1 * | 7/2008 | Reumann | ............... | G06Q 30/02 709/224 |

(Continued)

*Primary Examiner* — Amare F Tabor
*Assistant Examiner* — Mahabub S Ahmed
(74) *Attorney, Agent, or Firm* — Fenwick & West LLP (57) ABSTRACT

An online system receives information describing a request from a user to perform an action within a guest application and information identifying a host application for determining whether to allow the user to do so. The information describing the request is communicated to the host application for comparison to a set of permissions. Upon receiving information indicating the information describing the request matches a permission identifying a user allowed to perform an action within the guest application, the online system communicates, to the host application, a message for display to the user including an option allowing the user to perform the action within the guest application. Upon receiving a selection of the option at the host application, the online system receives a token allowing the user to perform the action within the guest application and communicates it to the guest application. The host and guest applications also may communicate directly.

20 Claims, 5 Drawing Sheets

(56) References Cited

U.S. PATENT DOCUMENTS

| | | | | |
|---|---|---|---|---|
| 2008/0214167 A1* | 9/2008 | Natsuno | ............. | G06F 21/10 |
| | | | | 455/414.3 |
| 2009/0235342 A1* | 9/2009 | Manion | ............. | H04L 63/08 |
| | | | | 726/7 |
| 2010/0175104 A1* | 7/2010 | Khalid | ............. | G06F 21/53 |
| | | | | 726/1 |
| 2011/0208822 A1* | 8/2011 | Rathod | ............. | G06Q 30/02 |
| | | | | 709/206 |
| 2012/0208460 A1* | 8/2012 | Shin | ............. | H04B 5/00 |
| | | | | 455/41.1 |
| 2013/0007845 A1* | 1/2013 | Chang | ............. | H04L 63/104 |
| | | | | 726/4 |
| 2013/0043302 A1* | 2/2013 | Powlen | ............. | G06Q 50/01 |
| | | | | 235/494 |
| 2013/0205366 A1* | 8/2013 | Luna | ............. | H04L 63/101 |
| | | | | 726/1 |
| 2013/0227565 A1* | 8/2013 | Lee | ............. | G06F 9/45558 |
| | | | | 718/1 |
| 2014/0020072 A1* | 1/2014 | Thomas | ............. | H04L 67/10 |
| | | | | 726/7 |
| 2014/0082715 A1* | 3/2014 | Grajek | ............. | H04W 12/068 |
| | | | | 726/8 |
| 2014/0095692 A1* | 4/2014 | Anderson | ............. | G06F 11/3003 |
| | | | | 709/224 |
| 2014/0123222 A1* | 5/2014 | Omar | ............. | H04L 63/102 |
| | | | | 726/3 |
| 2014/0189195 A1* | 7/2014 | Chen | ............. | G06F 9/45558 |
| | | | | 711/6 |
| 2016/0197993 A1* | 7/2016 | Perkowski | ............. | H04L 67/02 |
| | | | | 709/203 |
| 2016/0291995 A1* | 10/2016 | Ren | ............. | G06F 9/45558 |
| 2017/0105031 A1* | 4/2017 | Sheppard | ............. | G06F 16/285 |
| 2017/0301043 A1* | 10/2017 | Soli | ............. | H04L 51/52 |
| 2018/0083941 A1* | 3/2018 | Thakkar | ............. | H04L 63/08 |
| 2018/0115552 A1* | 4/2018 | Kantubukta | ............. | H04L 67/02 |
| 2018/0359259 A1* | 12/2018 | Leon | ............. | G06F 9/445 |
| 2019/0098057 A1* | 3/2019 | Tee | ............. | G06F 11/0781 |
| 2019/0266000 A1* | 8/2019 | Tsirkin | ............. | G06F 9/45558 |
| 2020/0294043 A1* | 9/2020 | Clarke | ............. | G06Q 30/02 |
| 2021/0090578 A1* | 3/2021 | Trapp | ............. | H04L 63/102 |
| 2021/0105274 A1* | 4/2021 | Bender | ............. | H04L 63/0876 |

* cited by examiner

USING A HOST APPLICATION TO AUTHORIZE A USER OF A CLIENT DEVICE TO PERFORM AN ACTION WITHIN A GUEST APPLICATION

TECHNICAL FIELD

This disclosure relates generally to applications, and more specifically to using a host application to determine whether a user of a client device is allowed to perform an action within a guest application.

BACKGROUND

Conventionally, applications (e.g., messaging applications, shopping applications, mobile game applications, etc.) allow their users to access the applications and to perform transactions within the applications upon performing authentication or authorization processes that verify whether the users are allowed to do so. To perform such authentication or authorization processes, the applications may request credentials from the users, which often include a combination of a unique identifier (e.g., a username or an email address) and a password for each user. The applications may then compare the credentials to those associated with user accounts for users of the applications and may determine whether to allow the users to access the applications or to perform transactions within the applications based on whether the credentials match. For example, upon receiving a request to log in to a mobile banking application from a user of a client device, the mobile banking application may require the user to provide credentials, such as a combination of a username and a password, to authenticate an identity of the user and may compare the credentials to those associated with user accounts for users of the mobile banking application. In the above example, if the credentials provided by the user match those associated with a user account for a user of the mobile banking application, the mobile banking application may allow the user to log in to the user account. Alternatively, in the above example, if the credentials provided by the user do not match those associated with a user account for a user of the mobile banking application, the mobile banking application may not allow the user to log in to any user account.

However, due to the increasing popularity of applications, requiring application users to provide credentials for different applications in order to perform authentication or authorization processes within these applications may pose several problems. In some cases, users may find it difficult to memorize different sets of credentials for each application they use, especially if the applications have different requirements for their credentials, such as a minimum or a maximum password length, a minimum number of characters of various types (e.g., numbers, uppercase letters, or symbols) required to be included in each password, etc. Furthermore, users who prefer to store their credentials for different applications may find it inconvenient to retrieve a set of credentials each time they use an application. Additionally, users may find it time-consuming to reset their credentials in the event that they forget or misplace them. Moreover, although users of multiple applications may find it more convenient to memorize a single set of credentials required for all of the applications they use, in the event of a security breach affecting one of these applications, the users' private information within all of the applications may be compromised. As a result, application users may reduce or even discontinue to use the applications.

SUMMARY

Applications conventionally allow their users to access the applications and to perform transactions within the applications upon performing authentication or authorization processes that verify whether the users are allowed to do so. To perform such authentication or authorization processes, the applications may request credentials from the users, which the applications may then compare to those associated with user accounts associated with users of the applications. The applications may then determine whether to allow the users to access the applications or to perform transactions within the applications based on whether the credentials match. However, due to the increasing popularity of applications, requiring application users to provide credentials for different applications in order to perform authentication or authorization processes within these applications may pose several problems, which may cause the users to reduce or even discontinue to use the applications.

To address this issue, a host application is used to determine whether a user of a client device is allowed to perform an action within a guest application. More specifically, an online system receives information describing a request from a requesting user of a client device to perform a requested action within a guest application and information identifying a host application to be used to determine whether the requesting user is allowed to perform the requested action within the guest application. The online system communicates, to the host application, the information describing the request for comparison to a set of permissions, in which the information describing the request includes user-identifying information for the requesting user, information describing the requested action, and information identifying the guest application and each of the set of permissions identifies a user of the guest application allowed to perform a type of action within the guest application. Responsive to receiving, at the online system, information indicating that the information describing the request matches a permission, the online system communicates, to the host application, a message for display to the requesting user, in which the message includes a selectable option to allow the requested action to be performed by the requesting user within the guest application. Responsive to receiving, at the host application, a selection of the option to allow the requested action to be performed by the requesting user within the guest application, the online system receives a token that allows the requesting user to perform the requested action within the guest application, which the online system then communicates to the guest application.

In some embodiments, the host application and the guest application may communicate directly with each other (e.g., in embodiments in which an operating system running on the client device of the requesting user allows direct communication between the host application and the guest application). In such embodiments, the host application receives information describing a request from the requesting user of the client device to perform a requested action within the guest application, in which the information describing the request includes user-identifying information for the requesting user, information describing the requested action, and information identifying the guest application. The host application compares the information describing the request to a set of permissions, in which each of the set of permissions identifies a user of the guest application allowed to perform a type of action within the guest application. Responsive to determining that the information describing the request matches a permission, the host application sends a message for display to the requesting user, in which the message includes a selectable option to allow the requested action to be performed by the requesting user within the guest application. Responsive to receiving a selection of the option to allow the requested action to be performed by the requesting user within the guest application, the host application communicates a token to the guest application that allows the requesting user to perform the requested action within the guest application.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
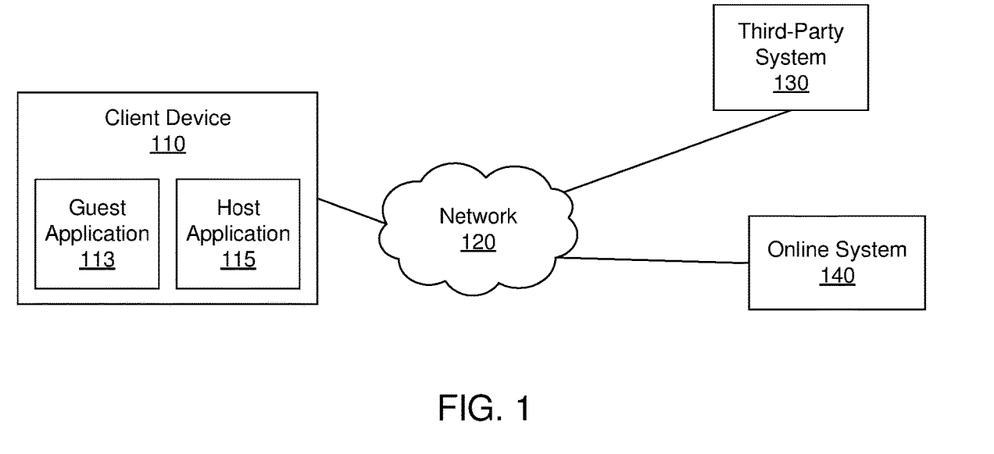
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110.

An application (e.g., a web application or a mobile application) installed on one or more of the client devices 110 may be a guest application 113 that requires the identities if its users to be authenticated and/or that requires transactions performed within the guest application 113 to be authorized by its users. For example, a guest application 113 may be a mobile banking application that requires each of its users to provide a combination of an email and a password to authenticate an identity of the user. As an additional example, a guest application 113 may be a gaming application that requires each of its users to provide a combination of a username and a password to authorize a purchase of a virtual commodity within the gaming application.

A guest application 113 may be associated with a "guest," such as a business or other entity, that has performed a registration process that allows a host application 115 (described below) to be used to determine whether a user of a client device 110 is allowed to perform an action within the guest application 113. In some embodiments, the registration process may be performed with the online system 140, while in other embodiments, the registration process may be performed with the host application 115. For example, a guest associated with a guest application 113 may perform a registration process by requesting that one or more host applications 115 be used to determine whether a user of a client device 110 is allowed to perform an action within the guest application 113. In the above example, the request may be sent to the online system 140 or to a host associated with each host application 115. Continuing with the above example, if a host associated with a host application 115 approves the request, the host application 115 may access a set of permissions associated with the guest application 113, in which each permission identifies a user of the guest application 113 allowed to perform a type of action within the guest application 113. In this example, the host application 115 also may access a set of credentials that may be used to generate a token that allows the user of the guest application 113 to perform the type of action within the guest application 113. The guest application 113 is further described below in conjunction with FIG. 3.

An application (e.g., a web application or a mobile application) installed on one or more of the client devices 110 also may be a host application 115 that determines whether a user of a client device 110 on which the host application 115 is installed is allowed to perform an action within a guest application 113 that also is installed on the client device 110. To do so, the host application 115 compares information describing a request received from the user to perform the action within the guest application 113 (e.g., user-identifying information for the user, information describing the action, and information identifying the guest application 113) to a set of permissions, in which each permission identifies a user of the guest application 113 allowed to perform a type of action within the guest application 113. Upon determining that the information describing the request matches a permission, the host application 115 sends a message for display to the user, in which the message includes a selectable option to allow the action to be performed by the user within the guest application 113. Upon receiving a selection of the option to allow the action to be performed by the user within the guest application 113, the host application 115 communicates a token to the guest application 113 that allows the user to perform the action within the guest application 113. In some embodiments, a host application 115 may be a messaging application. A host application 115 may be controlled by the online system 140 or independent of the online system 140. In some embodiments, a host application 115 and a guest application 113 may communicate indirectly via the online system 140. In other embodiments, a host application 115 and a guest application 113 may communicate directly (e.g., if an operating system running on a client device 110 on which the host application 115 and the guest application 113 are installed allows this).

A host application 115 may be associated with a "host," such as a business or other entity, that may have performed a registration process that allows the host application 115 to determine whether a user of a client device 110 on which the host application 115 is installed is allowed to perform an action within a guest application 113 that also is installed on the client device 110. In some embodiments, this registration process may be performed with the online system 140. For example, a host associated with a host application 115 may perform a registration process with the online system 140, in which the host indicates that the host application 115 is capable of being used to determine whether a user of a client device 110 is allowed to perform an action within a guest application 113. In this example, once the registration process is complete, a guest associated with a guest application 113 may request, via the online system 140, that the host application 115 be used to determine whether a user of a client device 110 is allowed to perform an action within the guest application 113. In the above example, if the host application 115 approves the request, the host application 115 may access permissions identifying users of the guest application 113 allowed to perform one or more types of actions within the guest application 113, as well as credentials that may be used to generate tokens that allow the users to perform the type(s) of actions within the guest application 113. The host application 115 is further described below in conjunction with FIG. 4.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. A third-party system 130 also may communicate information to the online system 140, such as advertisements, content, or information about an application provided by the third-party system 130.

Figure 2:
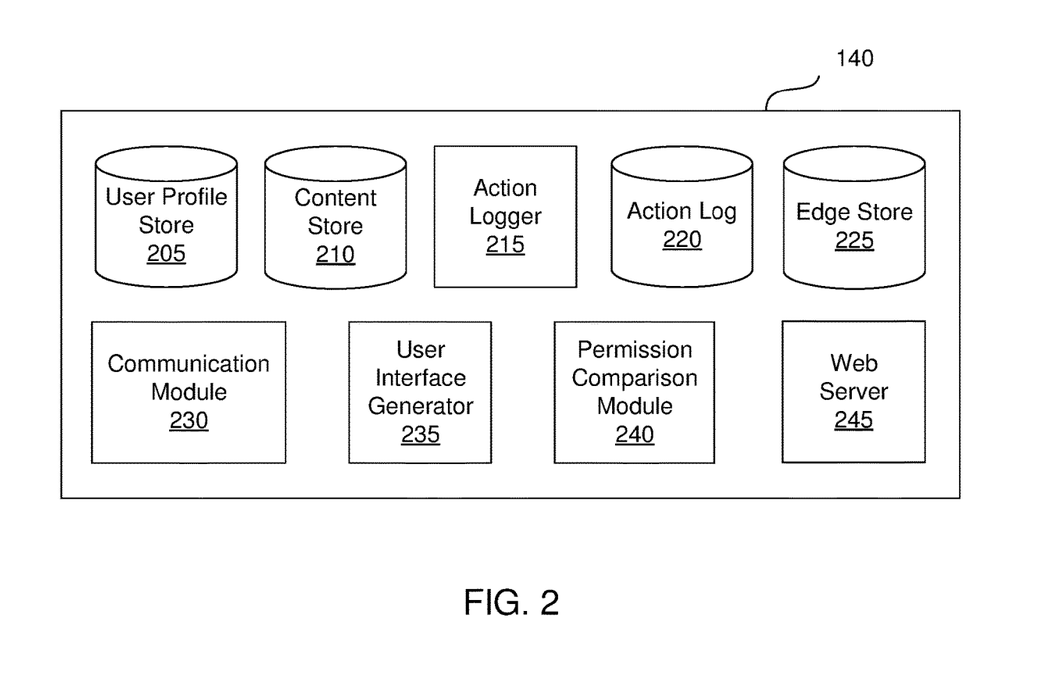
FIG. 2 is a block diagram of an online system, in accordance with an embodiment.

FIG. 2 is a block diagram of an architecture of the online system 140. In some embodiments, the online system 140 provides a service, such as a messaging service. The online system 140 shown in FIG. 2 includes a user profile store 205, a content store 210, an action logger 215, an action log 220, an edge store 225, a communication module 230, a user interface generator 235, a permission comparison module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, an image (e.g., a photograph), a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The communication module 230 of the online system 140 may receive (e.g., as shown in step 505 of FIG. 5A) information describing a request from a user of a client device 110 to perform an action within a guest application 113 and information identifying a host application 115 to be used to determine whether the user is allowed to perform the action within the guest application 113. The communication module 230 of the online system 140 may receive the information describing the request and the information identifying the host application 115 from the guest application 113 using a client-side SDK for the guest application 113 that is provided by the online system 140. The information describing the request may include user-identifying information for the user (e.g., an email address, a username, or any other suitable unique identifier associated with the user), information describing the action, and information identifying the guest application 113 (e.g., a name, an identification number, or any other suitable unique identifier associated with the guest application 113). For example, the communication module 230 of the online system 140 may receive a phone number of a user of a client device 110, information identifying a guest application 113, information indicating that the user is requesting to log in to the guest application 113, and information identifying a host application 115 to be used to determine whether the user is allowed to log in to the guest application 113.

The communication module 230 of the online system 140 also may communicate (e.g., as shown in step 510 of FIG. 5A), to a host application 115, information describing a request from a user of a client device 110 to perform an action within a guest application 113, which the host application 115 may then compare to a set of permissions. As described above, the information describing the request may include user-identifying information for the user, information describing the action, and information identifying the guest application 113. The communication module 230 of the online system 140 may communicate the information describing the request to the host application 115 based on information identifying the host application 115 received from the guest application 113. In some embodiments, the communication module 230 of the online system 140 may communicate the information describing the request to a webhook associated with the host application 115 that compares the information to the set of permissions.

The communication module 230 of the online system 140 may receive (e.g., as shown in step 515 of FIG. 5A) information from a host application 115 indicating that information describing a request from a user of a client device 110 to perform an action within a guest application 113 matches a permission identifying a user of the guest application 113 allowed to perform a type of action within the guest application 113. In some embodiments, the communication module 230 of the online system 140 may receive this information in association with a unique identifier associated with the user (e.g., a username associated with the user in the host application 115). In such embodiments, the unique identifier may be used by the user interface generator 235 of the online system 140 to generate a message for display to the user, as described below.

The communication module 230 of the online system 140 also may communicate (e.g., as shown in step 520 of FIG. 5A), to a host application 115, a message for display to a user of a client device 110 requesting to perform an action within a guest application 113. The message may include a selectable option to allow the action to be performed by the user within the guest application 113. In various embodiments, the message may be generated by the user interface generator 235 of the online system 140, as described below. In some embodiments, the message may be communicated to the host application 115 using a client-side SDK for the host application 115, in which the client-side SDK is provided by the online system 140.

The communication module 230 of the online system 140 also may receive (e.g., as shown in step 530 of FIG. 5A) a token from a host application 115 that allows a user of a client device 110 to perform an action within a guest application 113. The communication module 230 of the online system 140 may receive the token in response to receiving, at the host application 115, a selection of an option to allow the action to be performed by the user within the guest application 113. In some embodiments, the communication module 230 of the online system 140 may receive the token from the host application 115 in association with the selection of the option to allow the action to be performed by the user within the guest application 113. The token may include credentials required by the guest application 113 to allow the user to perform the action within the guest application 113. For example, if the action corresponds to authenticating an identity of a user of the guest application 113, the token may include a combination of a username and a password required to authenticate an identity of a user of a client device 110 within the guest application 113.

The communication module 230 of the online system 140 also may communicate (e.g., as shown in step 535 of FIG. 5A), to a guest application 113, a token that allows a user of a client device 110 to perform an action within the guest application 113. As described above, the token may include credentials required by the guest application 113 to allow the user to perform the action within the guest application 113. In some embodiments, the token is communicated to the guest application 113 by the communication module 230 of the online system 140 using a client-side SDK for the guest application 113, in which the client-side SDK is provided by the online system 140. As described below, in some embodiments, the permission comparison module 240 of the online system 140 may access a set of credentials stored in association with a permission identifying a user of a client device 110 allowed to perform a type of action within a guest application 113. In such embodiments, the communication module 230 of the online system 140 may communicate the set of credentials to the guest application 113. The functionality of the communication module 230 of the online system 140 is further described below in conjunction with FIG. 5A.

The user interface generator 235 of the online system 140 may generate a message for display to a user of a client device 110, in which the message includes a selectable option to allow an action to be performed by the user within a guest application 113. In some embodiments, the message also may include a selectable option not to allow the action to be performed by the user of the client device 110 within the guest application 113. In various embodiments, the message may include one or more interactive elements (e.g., a button, a checkbox, etc.) that allow the user of the client device 110 to select an option by interacting with a corresponding interactive element. The message also may include or be associated with a unique identifier associated with the user, which may be used by a host application 115 to send the message for display to the user. For example, the user interface generator 235 of the online system 140 may generate a message including a username for a user of a client device 110 within a host application 115, a first selectable option to allow the user to log in to a guest application 113, and a second selectable option not to allow the user to log in to the guest application 113. In this example, the communication module 230 of the online system 140 may communicate this message to the host application 115, which then sends the message for display to the user as a push notification in a pop-up window presented in a display area of the client device 110. Continuing with this example, the user may select the first option or the second option by clicking on a button for the corresponding option. The functionality of the user interface generator 235 of the online system 140 is further described below in conjunction with FIG. 5A.

In some embodiments, the permission comparison module 240 of the online system 140 may compare information describing a request from a user of a client device 110 to perform an action within a guest application 113 to a set of permissions (e.g., stored in the permission store 410 of a host application 115 or in a cloud database, as described below). In such embodiments, the permission comparison module 240 of the online system 140 also may determine whether the information describing the request matches a permission identifying a user of a guest application 113 allowed to perform a type of action within the guest application 113. As described below, in some embodiments, each permission identifying a user of a guest application 113 allowed to perform a type of action within the guest application 113 may be stored in association with a set of credentials required by the guest application 113 to allow the user to perform the type of action. In such embodiments, upon determining that the information describing the request matches a permission, the permission comparison module 240 of the online system 140 also may access a set of credentials stored in association with the permission. The permission comparison module 240 of the online system 140 is further described below in conjunction with FIG. 5A.

The web server 245 links the online system 140 via the network 120 to the one or more client devices 110, as well as to the one or more third-party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or BlackberryOS.

Figure 3:
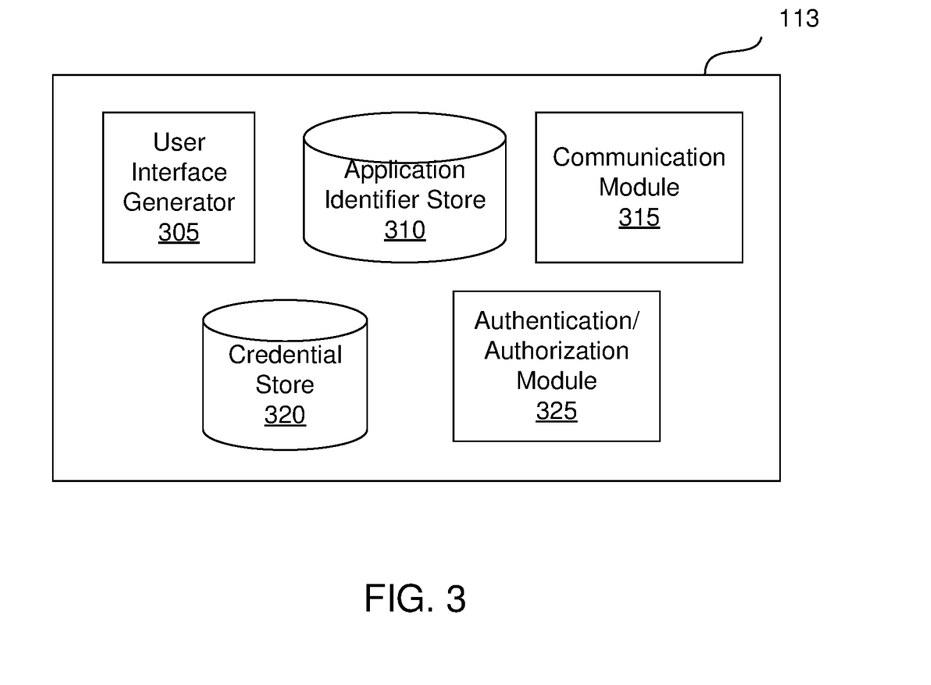
FIG. 3 is a block diagram of a guest application, in accordance with an embodiment.

FIG. 3 is a block diagram of an architecture of the guest application 113. The guest application 113 shown in FIG. 3 includes a user interface generator 305, an application identifier store 310, a communication module 315, a credential store 320, and an authentication/authorization module 325. In other embodiments, the guest application 113 may include additional, fewer, or different components for various applications.

The user interface generator 305 of the guest application 113 may generate a user interface for receiving a request from a user of a client device 110 to perform an action within the guest application 113 and information identifying a host application 115 to be used to determine whether the user is allowed to perform the action within the guest application 113. The user interface may correspond to a form that includes various input elements that allow the user to request to perform the action within the guest application 113 and to provide the information identifying the host application 115. Examples of such input elements include text fields, drop-down menus, buttons, or any other suitable types of input elements. For example, the user interface generator 305 of the guest application 113 may generate a user interface for receiving a request to log in to the guest application 113 from a user of a client device 110 on which the guest application 113 is installed. In this example, once the user interface is sent for display to the user via the client device 110, the user may enter (e.g., into a text field included in the user interface) their username within a host application 115 to be used to authenticate the identity of the user and select a name of the host application 115 (e.g., from a drop-down menu of host applications 115 also included in the user interface). Continuing with the above example, the guest application 113 may receive the request once the user clicks on a submit button included in the user interface. In some embodiments, the input elements may be pre-populated or pre-selected (e.g., based on inputs or preferences previously received from the user). The functionality of the user interface generator 305 of the guest application 113 is further described below in conjunction with FIGS. 5A and 5B.

The application identifier store 310 may store information identifying one or more host applications 115 that may be used to determine whether a user of a client device 110 is allowed to perform an action within the guest application 113. Information identifying each host application 115 may correspond to a unique identifier, such as a unique name or identification number that is stored in the application identifier store 310. In some embodiments, information identifying each host application 115 is stored in the application identifier store 310 once a guest associated with the guest application 113 has performed a registration process with the host application 115 or with the online system 140, as described above. The application identifier store 310 is further described below in conjunction with FIGS. 5A and 5B.

The communication module 315 of the guest application 113 may communicate, to the online system 140, information describing a request from a user of a client device 110 to perform an action within the guest application 113 and information identifying a host application 115 to be used to determine whether the user is allowed to do so. As described above, the information describing the request may include user-identifying information for the user, information describing the action, and information identifying the guest application 113. In some embodiments, the communication module 315 of the guest application 113 may communicate the information describing the request and the information identifying the host application 115 to the online system 140 using a client-side SDK for the guest application 113, in which the client-side SDK is provided by the online system 140.

The communication module 315 of the guest application 113 also may communicate information describing a request from a user of a client device 110 to perform an action within the guest application 113 directly to a host application 115 to be used to determine whether the user is allowed to do so. The communication module 315 of the guest application 113 may communicate the information describing the request directly to the host application 115 in embodiments in which an operating system running on a client device 110 on which the guest application 113 and the host application 115 are installed allows for direct communication between the guest application 113 and the host application 115. As described above, the information describing the request may include user-identifying information for the user, information describing the action, and information identifying the guest application 113.

The communication module 315 of the guest application 113 also may receive a token that allows a user of a client device 110 to perform an action within the guest application 113. As described above, a token may include credentials required by the guest application 113 to allow the user to perform the action within the guest application 113. In some embodiments, the communication module 315 of the guest application 113 may receive the token from the online system 140 using a client-side SDK for the guest application 113, in which the client-side SDK is provided by the online system 140. In other embodiments, the communication module 315 of the guest application 113 may receive the token directly from a host application 115 used to determine whether the user of the client device 110 is allowed to perform the action within the guest application 113. The token may be communicated directly to the communication module 315 of the guest application 113 from the host application 115 if an operating system running on a client device 110 on which the guest application 113 and the host application 115 are installed allows for direct communication between the guest application 113 and the host application 115. In some embodiments, the communication module 315 of the guest application 113 also may receive credentials required by the guest application 113 to allow the user to perform the action within the guest application 113 from the online system 140 (e.g., using the client-side SDK for the guest application 113). The functionality of the communication module 315 of the guest application 113 is further described below in conjunction with FIGS. 5A and 5B.

The credential store 320 stores a set of credentials associated with each user of the guest application 113. A set of credentials associated with a user of the guest application 113 may allow the user to perform a type of action within the guest application 113, such as authenticating an identity of the user of the guest application 113 or authorizing a transaction within the guest application 113. For example, a set of credentials associated with a user of the guest application 113 may include a combination of a unique identifier (e.g., a username of the user within the guest application 113, an email address of the user, a phone number of the user, etc.) and a password. The credential store 320 is further described below in conjunction with FIGS. 5A and 5B.

The authentication/authorization module 325 may determine whether to allow a user of a client device 110 to perform an action within the guest application 113 based on a token received at the guest application 113 and/or based on a set of credentials received at the guest application 113. As described above, a token may include credentials required by the guest application 113 to allow the user of the client device 110 to perform the action within the guest application 113. For example, suppose that a user of a client device 110 has requested to make a purchase within the guest application 113, in which the guest application 113 corresponds to a mobile shopping application. In this example, upon receiving a token at the guest application 113, the authentication/authorization module 325 of the guest application 113 accesses the credential store 320 and determines whether credentials included in the token match those associated with a user of the guest application 113 allowed to make a purchase within the guest application 113. In the above example, the authentication/authorization module 325 may allow the user to make the purchase within the guest application 113 upon determining that the credentials match those associated with a user of the guest application 113 allowed to make a purchase within the guest application 113. Alternatively, in the above example, the authentication/authorization module 325 may not allow the user to make the purchase within the guest application 113 upon determining that the credentials do not match those associated with a user of the guest application 113 allowed to make a purchase within the guest application 113. The functionality of the authentication/authorization module 325 is further described below in conjunction with FIGS. 5A and 5B.

Figure 4:
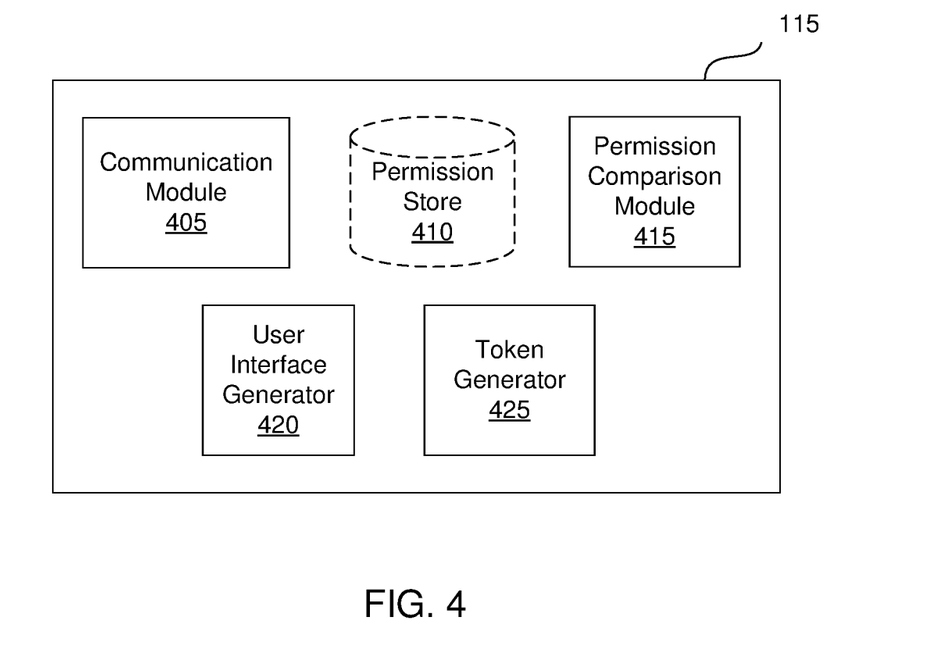
FIG. 4 is a block diagram of a host application, in accordance with an embodiment.

FIG. 4 is a block diagram of an architecture of the host application 115. The host application 115 shown in FIG. 4 includes a communication module 405, a permission store 410, a permission comparison module 415, a user interface generator 420, and a token generator 425. In other embodiments, the host application 115 may include additional, fewer, or different components for various applications.

The communication module 405 of the host application 115 may receive information describing a request from a user of a client device 110 to perform an action within a guest application 113. As described above, this information may include user-identifying information for the user, information describing the action, and information identifying the guest application 113. In some embodiments, the communication module 405 of the host application 115 may receive this information from the online system 140 (e.g., via a webhook associated with the host application 115). In various embodiments, the communication module 405 of the host application 115 may receive (e.g., as shown in step 510 of FIG. 5B) this information directly from the guest application 113 (e.g., if an operating system running on a client device 110 on which the guest application 113 and the host application 115 are installed allows for direct communication between the guest application 113 and the host application 115).

The communication module 405 of the host application 115 also may communicate a token that allows a user of a client device 110 to perform an action within a guest application 113. As described above, the token may include credentials required by the guest application 113 to allow the user of the client device 110 to perform the action within the guest application 113 (e.g., a combination of an email address and a password). In some embodiments, the communication module 405 of the host application 115 may communicate the token to the online system 140. In other embodiments, the communication module 405 of the host application 115 may communicate (e.g., as shown in step 535 of FIG. 5B) the token directly to the guest application 113. The communication module 405 of the host application 115 may do so in embodiments in which an operating system running on a client device 110 on which the guest application 113 and the host application 115 are installed allows for direct communication between the guest application 113 and the host application 115. The functionality of the communication module 405 of the host application 115 is further described below in conjunction with FIGS. 5A and 5B.

The permission store 410 stores a set of permissions, in which each permission identifies a user of a guest application 113 allowed to perform a type of action within the guest application 113. Information identifying a user of a guest application 113 included in a permission stored in the permission store 410 may correspond to user-identifying information for the user (e.g., an email address, a phone number, a username that is unique to the user within the guest application 113 or within the host application 115, or any other suitable unique identifier associated with the user). Examples of types of actions that may be performed within a guest application 113 that may be described by a permission stored in the permission store 410 include authenticating an identity of a user of the guest application 113, viewing a shopping list within the guest application 113, authorizing a transaction within the guest application 113 (e.g., making a purchase within the guest application 113 or changing a password within the guest application 113), or any other suitable types of actions that may be performed within a guest application 113. Information identifying a guest application 113 included in a permission stored in the permission store 410 may include a name, an identification number, or any other suitable unique identifier associated with the guest application 113. In some embodiments, the set of permissions is linked to a server-side SDK provided by the online system 140.

In some embodiments, each permission stored in the permission store 410 identifying a user of a guest application 113 allowed to perform a type of action within the guest application 113 is stored in association with a set of credentials required by the guest application 113 to allow the user to perform the action. In such embodiments, a set of credentials may include a combination of a unique identifier associated with a user of a guest application 113 (e.g., an email address, a phone number, a username of the user within the guest application 113, etc.) and additional information (e.g., a password, a PIN number, a passcode, a passphrase, a digital certificate, etc.). For example, if a permission stored in the permission store 410 identifies a user of a guest application 113 who is allowed to log in to the guest application 113, a set of credentials stored in association with the permission may include a combination of a username and a password required by the guest application 113 to allow the user to log in to the guest application 113.

In some embodiments, a set of permissions that each identifies a user of a guest application 113 allowed to perform a type of action within the guest application 113 may not be stored in the permission store 410 of the host application 115. In such embodiments, the set of permissions may be stored in a cloud database. For example, a set of permissions that each identifies a user of a guest application 113 allowed to perform a type of action within the guest application 113 may be stored in a database that runs on a cloud computing platform. Furthermore, in such embodiments, each permission stored in the cloud database may be stored in association with a set of credentials required by a guest application 113 to allow a user of the guest application 113 to perform an action within the guest application 113. The permission store 410 is further described below in conjunction with FIGS. 5A and 5B.

The permission comparison module 415 of the host application 115 compares (e.g., as shown in step 512 of FIG. 5B) information describing a request from a user of a client device 110 to perform an action within a guest application 113 to a set of permissions (e.g., stored in the permission store 410 or in a cloud database) and determines (e.g., as shown in step 514 of FIG. 5B) whether the information describing the request matches a permission. As described above, the information describing the request may include user-identifying information for the user, information describing the action, and information identifying the guest application 113. For example, suppose that a user of a client device 110 is requesting to update their contact information within a guest application 113 and that information describing the request includes an email address of the user, information indicating that the user is requesting to update their contact information, and a name of the guest application 113. In this example, the permission comparison module 415 of the host application 115 may compare the information describing the request to each of a set of permissions stored in the permission store 410 or in a cloud database and determine whether the information matches any of the permissions based on the comparison. The permission comparison module 415 of the host application 115 is further described below in conjunction with FIGS. 5A and 5B.

The user interface generator 420 of the host application 115 may generate a message for display to a user of a client device 110, in which the message includes a selectable option to allow an action to be performed by the user within a guest application 113. In some embodiments, the message also may include a selectable option not to allow the action to be performed by the user within the guest application 113. In various embodiments, the message may include one or more interactive elements (e.g., a button, a checkbox, etc.) that allow the user of the client device 110 to select an option by interacting with a corresponding interactive element. The message also may include or be associated with a unique identifier associated with the user (e.g., a username for the user within a host application 115), which may be used by the host application 115 to send the message for display to the user. For example, the user interface generator 420 of the host application 115 may generate a message including a username for a user of a client device 110 within the host application 115, a first selectable option to allow the user to make a purchase within a guest application 113, and a second selectable option not to allow the user to make the purchase within the guest application 113. In this example, once the message is sent for display to the user (e.g., via a push notification in a pop-up window presented in a display area of the client device 110), the user may select the first option or the second option by clicking on a button for the corresponding option. The functionality of the user interface generator 420 of the host application 115 is further described below in conjunction with FIGS. 5A and 5B.

The token generator 425 may generate a token that allows a user of a client device 110 to perform an action within a guest application 113. As described above, the token may include credentials required by the guest application 113 to allow the user to perform the action within the guest application 113. The token generator 425 may generate the token by retrieving a set of credentials associated with the user. In some embodiments, the token generator 425 may generate the token once the permission comparison module 415 of the host application 115 has determined that information describing a request from the user to perform the action within the guest application 113 matches a permission (e.g., stored in the permission store 410 or in a cloud database). For example, suppose that the permission comparison module 415 of the host application 115 has compared information describing a request from a user of a client device 110 to perform an action within a guest application 113 to a set of permissions (e.g., stored in the permission store 410 or in a cloud database) and has determined that the information describing the request matches a permission. In this example, the token generator 425 may then retrieve a set of credentials stored in association with the permission and generate a token that includes the credentials. In other embodiments, the token generator 425 may generate the token once the host application 115 receives (e.g., as shown in step 525 of FIGS. 5A and 5B) a selection of an option to allow the action to be performed by the user within the guest application 113. The functionality of the token generator 425 is further described below in conjunction with FIGS. 5A and 5B.

Figure 5A:
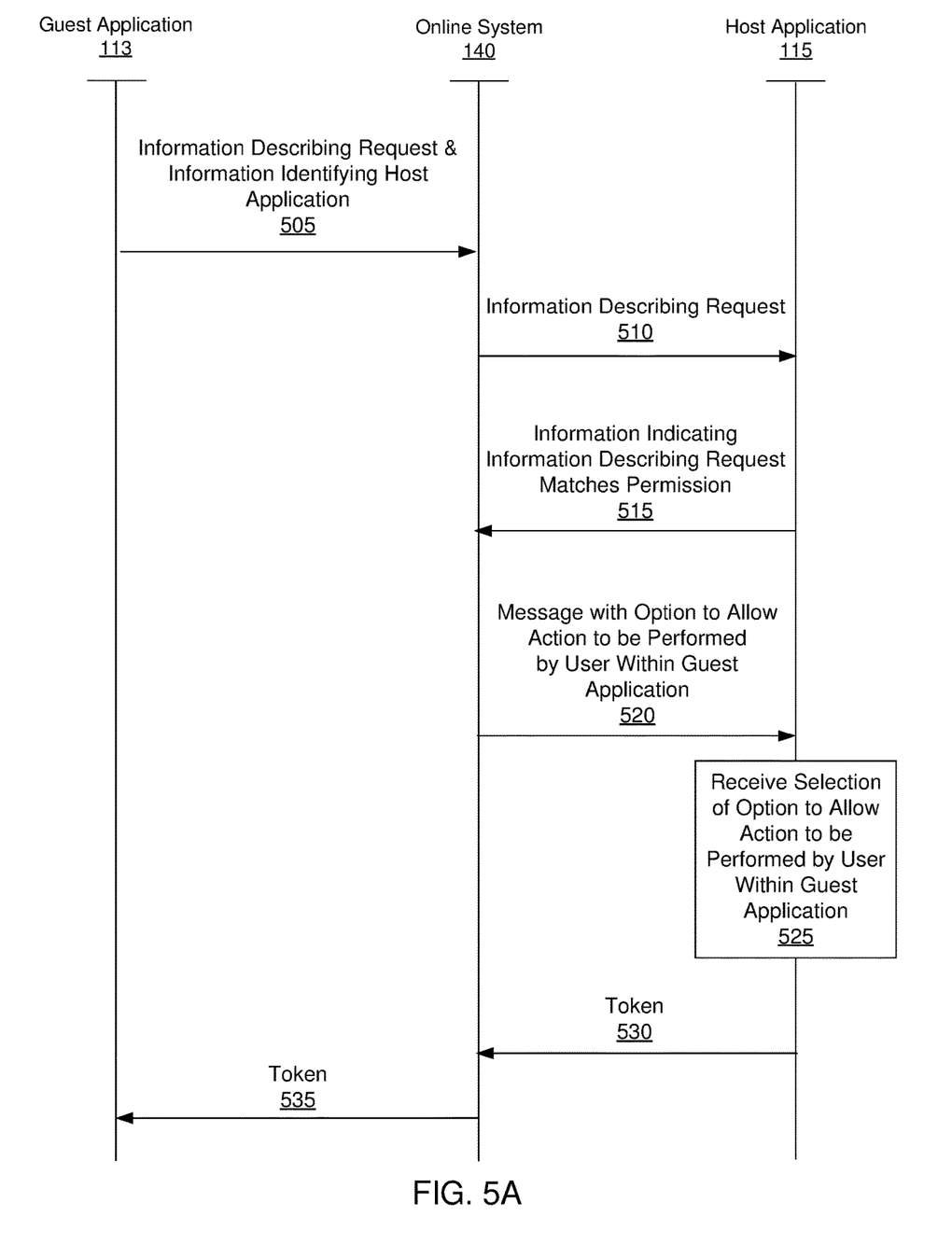
FIG. 5A is an interaction diagram of a method for using a host application to determine whether a user of a client device is allowed to perform an action within a guest application, in accordance with an embodiment.
Figure 5B:
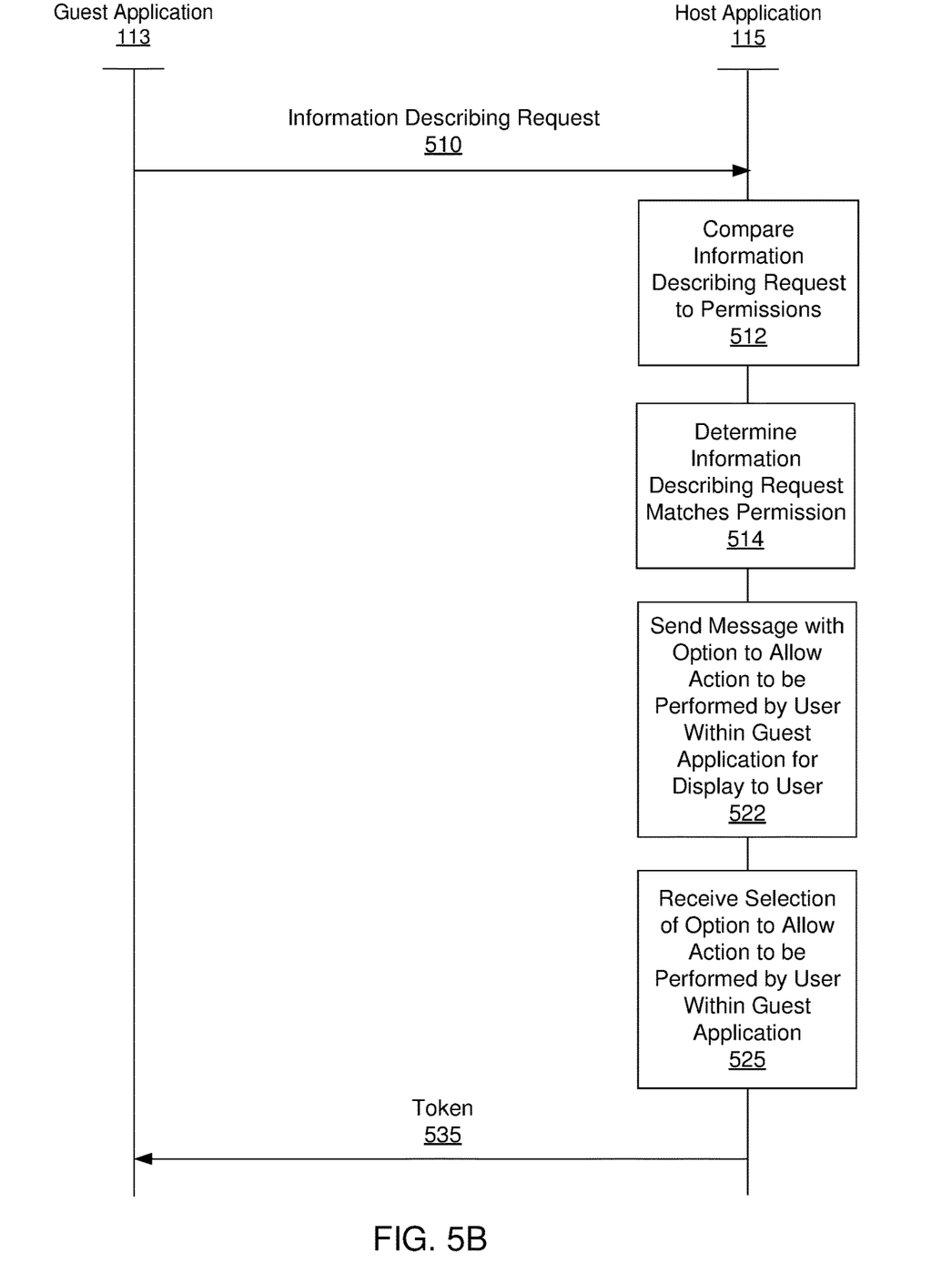
FIG. 5B is an additional interaction diagram of a method for using a host application to determine whether a user of a client device is allowed to perform an action within a guest application, in accordance with an embodiment.

Using a Host Application to Determine Whether a User of a Client Device is Allowed to Perform an Action within a Guest Application FIG. 5A is an interaction diagram of a method for using a host application to determine whether a user of a client device is allowed to perform an action within a guest application. FIG. 5B is an additional interaction diagram of a method for using a host application to determine whether a user of a client device is allowed to perform an action within a guest application. In other embodiments, the method may include different and/or additional steps than those shown in FIGS. 5A and 5B. Additionally, steps of the method may be performed in a different order than the order described in conjunction with FIGS. 5A and 5B.

Referring first to FIG. 5A, in some embodiments, the online system 140 relays information between a guest application 113 and a host application 115. In various embodiments, the online system 140 provides a service, such as a messaging service. In some embodiments, the host application 115 may be independent of the online system 140. In other embodiments, the host application 115 may be controlled by the online system 140. For example, if the online system 140 provides a messaging service and controls the host application 115, the host application 115 may be a messaging application.

Figure 6:
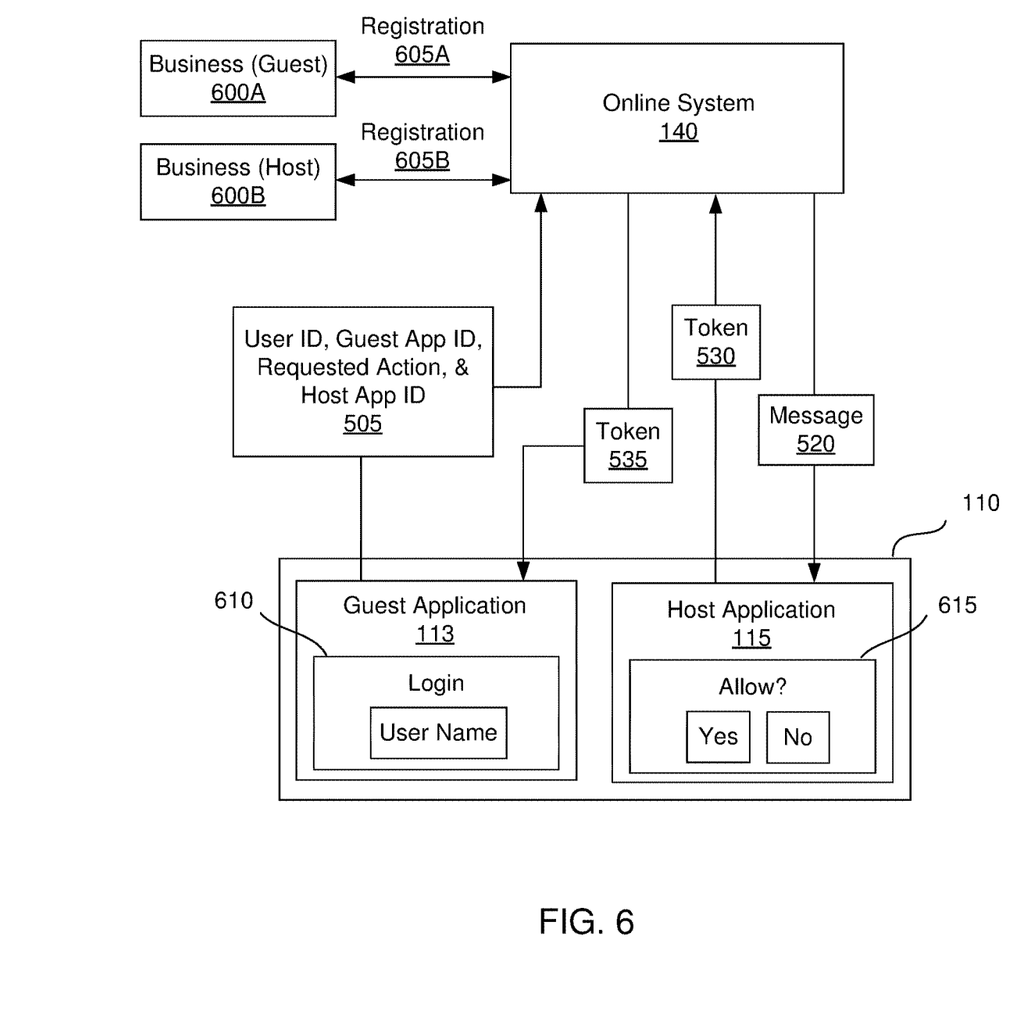
FIG. 6 is a conceptual diagram of a method for using a host application to determine whether a user of a client device is allowed to perform an action within a guest application, in accordance with an embodiment.

In the interaction diagram of FIG. 5A, the online system 140 receives 505 (e.g., using the communication module 230 of the online system 140) information describing a request from a requesting user of a client device 110 to perform a requested action within the guest application 113 and information identifying the host application 115 to be used to determine whether the requesting user is allowed to perform the requested action within the guest application 113. In some embodiments, the online system 140 may receive 505 the information describing the request and the information identifying the host application 115 using a client-side SDK for the guest application 113 provided by the online system 140. The information describing the request may include user-identifying information for the requesting user, information describing the requested action, and information identifying the guest application 113. For example, as shown in FIG. 6, suppose that a business corresponding to a guest 600A and a business corresponding to a host 600B have each performed a registration process 605A-B with the online system 140, such that a host application 115 associated with the host 600B may be used to determine whether a user of a client device 110 is allowed to perform an action within a guest application 113 associated with the guest 600A. In this example, suppose also that the guest application 113 has received (e.g., via a user interface 610 generated by the user interface generator 305 of the guest application 113 based on information stored in the application identifier store 310) a request from a requesting user of a client device 110 to log in to the guest application 113 and information identifying the host application 115 to be used to determine whether the requesting user is allowed to log in to the guest application 113. In this example, the online system 140 may then receive 505, (e.g., from the communication module 315 of the guest application 113), a user identifier that identifies the requesting user, an application identifier that identifies the guest application 113, information describing the requested action, and an application identifier that identifies the host application 115.

Referring back to FIG. 5A, the online system 140 then communicates 510 (e.g., using the communication module 230 of the online system 140) the information describing the request to the host application 115, which the host application 115 may then compare (e.g., using the permission comparison module 415 of the host application 115) to a set of permissions. The online system 140 may communicate 510 the information describing the request to the host application 115 based on the information identifying the host application 115 received 505 from the guest application 113. In some embodiments, the online system 140 may communicate 510 the information describing the request to a webhook associated with the host application 115 that compares the information to the set of permissions. In some embodiments, the set of permissions may be linked to a server-side SDK provided by the online system 140.

The online system 140 may then receive 515 (e.g., using the communication module 230 of the online system 140) information from the host application 115 indicating that the information describing the request matches a permission identifying a user of the guest application 113 allowed to perform a type of action within the guest application 113. Examples of types of actions that may be performed within the guest application 113 include authenticating an identity of a user of the guest application 113, authorizing a transaction within the guest application 113, or any other suitable type of action that may be performed within the guest application 113. In some embodiments, the online system 140 may receive 515 this information in association with a unique identifier associated with the requesting user (e.g., a username for the requesting user within the host application 115). In such embodiments, the online system 140 may use the unique identifier to generate a message for display to the requesting user (e.g., using the user interface generator 235 of the online system 140).

Although not illustrated in FIG. 5A, in some embodiments, the online system 140 may not communicate 510 the information describing the request to the host application 115 or subsequently receive 515 information from the host application 115 indicating that the information describing the request matches a permission. In various embodiments, the online system 140 may compare (e.g., using the permission comparison module 240 of the online system 140) the information describing the request to a set of permissions (e.g., stored in the permission store 410 of the host application 115 or in a cloud database). In such embodiments, the online system 140 also may determine (e.g., using the permission comparison module 240 of the online system 140) whether the information describing the request matches a permission identifying a user of the guest application 113 allowed to perform a type of action within the guest application 113. Furthermore, in such embodiments, once the online system 140 has determined that the information describing the request matches a permission, the online system 140 also may access (e.g., using the permission comparison module 240 of the online system 140) a set of credentials stored in association with the permission.

Referring now to FIG. 5A, the online system 140 then communicates 520 (e.g., using the communication module 230 of the online system 140), to the host application 115, a message for display to the requesting user that includes a selectable option to allow the requested action to be performed by the requesting user within the guest application 113. In some embodiments, the message may be communicated 520 to the host application 115 using a client-side SDK for the host application 115 provided by the online system 140. In some embodiments, the message also may include a selectable option not to allow the requested action to be performed by the requesting user and one or more interactive elements (e.g., a button, a checkbox, etc.) that allow the requesting user to select an option by interacting with a corresponding interactive element. In various embodiments, the message also may include or be associated with the unique identifier associated with the requesting user, which may be used by the host application 115 to send the message for display to the requesting user. The message may be generated by the online system 140 (e.g., using the user interface generator 235 of the online system 140). Although not illustrated in FIG. 5A, in some embodiments, (e.g., those in which the host application 115 and the online system 140 are independent of each other), the host application 115 may send the message for display to the requesting user after generating it (e.g., using the user interface generator 420 of the host application 115).

As shown in the example of FIG. 6, once the online system 140 has communicated 520 the message 615 to the host application 115, the host application 115 may send the message 615 for display to the requesting user (e.g., as a push notification in a pop-up window presented in a display area of the client device 110). In the above example, the message 615 may include a first selectable option to allow the requesting user to log in to the guest application 113 and a second selectable option not to allow the requesting user to log in to the guest application 113. Continuing with this example, the requesting user may select the first option or the second option by clicking on a button for the corresponding option.

Referring again to FIG. 5A, responsive to receiving 525, at the host application 115, a selection of the option to allow the requested action to be performed by the requesting user within the guest application 113, the online system 140 may receive 530 (e.g., using the communication module 230 of the online system 140) a token from the host application 115 that allows the requesting user to perform the requested action within the guest application 113. The token may include credentials required by the guest application 113 to allow the requesting user to perform the requested action within the guest application 113. For example, as shown in FIG. 6, since the requested action corresponds to logging in to the guest application 113, the token may include a combination of a username and a password required to log in to an account for the requesting user within the guest application 113. In some embodiments, the online system 140 may receive 530 the token from the host application 115 in association with the selection of the option to allow the action to be performed by the user within the guest application 113. In embodiments in which the host application 115 either does not receive 525 the selection of the option to allow the requested action to be performed by the requesting user within the guest application 113 or receives a selection of an option not to allow the requested action to be performed by the requesting user, the online system 140 may not receive 530 the token from the host application 115.

Referring once more to FIG. 5A, the online system 140 then communicates 535 (e.g., using the communication module 230 of the online system 140), to the guest application 113, the token that allows the requesting user to perform the requested action within the guest application 113. In some embodiments, the token is communicated 535 to the guest application 113 by the online system 140 using the client-side SDK for the guest application 113. Although not illustrated in FIG. 5A, in embodiments in which the online system 140 accesses a set of credentials stored in association with the permission matching the information describing the request, the online system 140 may communicate the set of credentials to the guest application 113. The online system 140 may do so responsive to receiving, at the host application 115 or at the online system 140, the selection of the option to allow the requested action to be performed by the requesting user within the guest application 113.

Once the token has been communicated 535 to the guest application 113, the guest application 113 may then determine (e.g., using the authentication/authorization module 325) whether to allow the requesting user to perform the requested action within the guest application 113 based on the token. For example, the guest application 113 may access the credential store 320 and determine whether the credentials included in the token match those associated with a user of the guest application 113 allowed to perform the requested action within the guest application 113. In this example, the guest application 113 may allow the requesting user to perform the requested action within the guest application 113 if the credentials included in the token match those associated with a user of the guest application 113 allowed to perform the requested action within the guest application 113. Alternatively, in the above example, the guest application 113 may not allow the requesting user to perform the requested action within the guest application 113 if the credentials included in the token do not match those associated with a user of the guest application 113 allowed to perform the requested action within the guest application 113. In embodiments in which the online system 140 communicates the set of credentials to the guest application 113, the guest application 113 may determine (e.g., using the authentication/authorization module 325) whether to allow the requesting user to perform the requested action within the guest application 113 based on the credentials.

Referring now to FIG. 5B, in some embodiments, the host application 115 and the guest application 113 may communicate directly with each other (e.g., in embodiments in which an operating system running on the client device 110 of the requesting user allows direct communication between the host application 115 and the guest application 113). In such embodiments, the host application 115 receives 510 (e.g., using the communication module 405 of the host application 115) the information describing the request from the requesting user of the client device 110 to perform the requested action within the guest application 113. As described above, this information may include user-identifying information for the requesting user, information describing the requested action, and information identifying the guest application 113. As also described above, the host application 115 may receive 510 this information from the guest application 113, which may have received the information via a user interface generated by the guest application 113 (e.g., using the user interface generator 305 of the guest application 113 based on information stored in the application identifier store 310).

The host application 115 then compares 512 (e.g., using the permission comparison module 415 of the host application 115) the information describing the request to a set of permissions, in which each permission identifies a user of the guest application 113 allowed to perform a type of action within the guest application 113. Examples of types of actions that may be performed within the guest application 113 include authenticating an identity of a user of the guest application 113, authorizing a transaction within the guest application 113, or any other suitable type of action that may be performed within the guest application 113. In some embodiments, the set of permissions may be stored at the host application 115 (e.g., in the permission store 410). In other embodiments, the set of permissions may be stored in a cloud database that may be accessed by the host application 115. In some embodiments, each permission is stored in association with a set of credentials (e.g., a combination of a unique identifier associated with a user of the guest application 113 and a PIN number) required by the guest application 113 to allow a user of the guest application 113 to perform a type of action within the guest application 113.

Based on the comparison, the host application 115 determines 514 (e.g., using the permission comparison module 415 of the host application 115) whether the information describing the request matches a permission. For example, suppose that the requesting user of the client device 110 is requesting to change their password within the guest application 113 and that information describing the request includes a phone number of the user, information indicating that the user is requesting to change their password, and a name of the guest application 113. In this example, the host application 115 may compare 512 the information describing the request to each of a set of permissions stored in the host application 115 or in a cloud database and determine 514 whether the information matches any of the permissions.

Responsive to determining 514 that the information describing the request matches a permission, the host application 115 sends 522 a message for display to the requesting user, in which the message includes a selectable option to allow the requested action to be performed by the requesting user within the guest application 113. As described above, in various embodiments, the message also may include a selectable option not to allow the requested action to be performed by the requesting user within the guest application 113 and/or one or more interactive elements (e.g., a button, a checkbox, etc.) that allow the requesting user to select an option by interacting with a corresponding interactive element. The message also may include or be associated with a unique identifier associated with the requesting user (e.g., a username for the requesting user within the host application 115), which may be used by the host application 115 to send 522 the message for display to the requesting user. In some embodiments, the host application 115 may send 522 the message for display to the requesting user as a push notification. In various embodiments, the message may be generated by the host application 115 (e.g., using the user interface generator 420 of the host application 115).

In some embodiments, responsive to determining 514 that the information describing the request matches a permission, the host application 115 also may generate (e.g., using the token generator 425) the token that allows the requesting user to perform the requested action within the guest application 113. As described above, the token may include credentials required by the guest application 113 to allow the requesting user to perform the requested action within the guest application 113 (e.g., a combination of an email address and a password). For example, suppose that the host application 115 has compared 512 the information describing the request from the requesting user to perform the requested action within the guest application 113 to a set of permissions (e.g., stored in the permission store 410 or in a cloud database) and has determined 514 that the information describing the request matches a permission. In this example, the host application 115 may retrieve a set of credentials stored in association with the permission and generate a token that includes the credentials.

Responsive to receiving 525 a selection of the option to allow the requested action to be performed by the requesting user within the guest application 113, the host application 115 communicates 535 (e.g., using the communication module 405 of the host application 115), to the guest application 113, the token that allows the requesting user to perform the requested action within the guest application 113. In some embodiments, the token may be generated by the host application 115 (e.g., using the token generator 425) responsive to receiving 525 the selection of the option to allow the requested action to be performed by the requesting user within the guest application 113. In embodiments in which the host application 115 either does not receive 525 the selection of the option to allow the requested action to be performed by the requesting user within the guest application 113 or receives a selection of an option not to allow the requested action to be performed by the requesting user, the host application 115 may not communicate 535 the token to the guest application 113. As described above in conjunction with FIG. 5A, once the token has been communicated 535 to the guest application 113, the guest application 113 may then determine (e.g., using the authentication/authorization module 325) whether to allow the requesting user to perform the requested action within the guest application 113 based on the token.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, information describing a request from a requesting user of a client device to perform a requested action within a guest application on the client device and information identifying a host application on the client device to be used to determine whether the requesting user is allowed to perform the requested action within the guest application;
communicating, to the host application, the information describing the request for comparison to a set of permissions, wherein the information describing the request comprises user-identifying information for the requesting user, information describing the requested action, and information identifying the guest application and each of the set of permissions identifies a user of the guest application allowed to perform a type of action within the guest application;
responsive to receiving, at the online system, information indicating that the information describing the request matches a permission of the set of permissions, communicating, to the host application, a message for display to the requesting user via the host application, the message comprising a selectable option to allow the requested action to be performed by the requesting user within the guest application;
responsive to receiving, at the host application, a selection of the option to allow the requested action to be performed by the requesting user within the guest application, receiving, at the online system, a token that allows the requesting user to perform the requested action within the guest application; and
communicating the token to the guest application.

2. The method of claim 1, wherein the online system provides a messaging service.

3. The method of claim 1, wherein the message is communicated to the host application using a client-side SDK for the host application, wherein the client-side SDK is provided by the online system.

4. The method of claim 1, wherein the set of permissions is linked to a server-side SDK provided by the online system.

5. The method of claim 1, wherein the set of permissions is maintained at one or more of: a cloud database and the host application.

6. The method of claim 1, wherein the online system receives the information describing the request and the information identifying the host application using a client-side SDK for the guest application, wherein the client-side SDK is provided by the online system.

7. The method of claim 6, wherein the token is communicated to the guest application using the client-side SDK for the guest application.

8. The method of claim 1, wherein the type of action comprises authenticating an identity of a user of the guest application or authorizing a transaction within the guest application.

9. The method of claim 1, wherein the online system receives the token from the host application in association with the selection of the option to allow the requested action to be performed by the requesting user within the guest application.

10. The method of claim 1, wherein the host application comprises a mobile messaging application.

11. A computer program product comprising a computer readable storage medium having instructions encoded thereon that, when executed by a processor, cause the processor to:
receive, at a host application on a client device, information describing a request from a requesting user of the client device to perform a requested action within a guest application on the client device, the information describing the request comprising user-identifying information for the requesting user, information describing the requested action, and information identifying the guest application;
compare the information describing the request to a set of permissions, each of the set of permissions identifying a user of the guest application allowed to perform a type of action within the guest application;
responsive to determining that the information describing the request matches a permission of the set of permissions, send a message for display to the requesting user via the host application, the message comprising a selectable option to allow the requested action to be performed by the requesting user within the guest application; and
responsive to receiving a selection of the option to allow the requested action to be performed by the requesting user within the guest application, communicating, to the guest application, a token that allows the requesting user to perform the requested action within the guest application.

12. The computer program product of claim 11, wherein the information describing the request is received at the host application from an online system that provides a messaging service.

13. The computer program product of claim 12, wherein the message is received from the online system using a client-side SDK for the host application, wherein the client-side SDK is provided by the online system.

14. The computer program product of claim 12, wherein the set of permissions is linked to a server-side SDK provided by the online system.

15. The computer program product of claim 11, wherein the set of permissions is maintained at one or more of: a cloud database and the host application.

16. The computer program product of claim 11, wherein the computer-readable storage medium further has instructions encoded thereon that, when executed by the processor, cause the processor to:
generate, at the host application, the token that allows the requesting user to perform the requested action within the guest application.

17. The computer program product of claim 11, wherein the host application comprises a mobile messaging application and the message is sent for display to the requesting user as a push notification.

18. The computer program product of claim 11, wherein the type of action comprises authenticating an identity of a user of the guest application or authorizing a transaction within the guest application.

19. The computer program product of claim 11, wherein an operating system running on the client device allows direct communication between the host application and the guest application.

20. The computer program product of claim 11, wherein the message is generated by the host application.

* * * * *